Oct. 26, 1954 H. B. BRIGGS 2,692,952

SEMICONDUCTIVE LIGHT VALVE

Filed March 14, 1952

INVENTOR
H. B. BRIGGS
BY [signature]
ATTORNEY

UNITED STATES PATENT OFFICE 2,692,952

SEMICONDUCTIVE LIGHT VALVE

Howard B. Briggs, Chatham, N. J., assignor to Bell Telephone Laboratories, Incorporated, New York, N. Y., a corporation of New York Application March 14, 1952, Serial No. 276,507

13 Claims. (Cl. 250—83.3)

This invention relates to light translating devices and more particularly to light valves of the type disclosed in Wallace application Serial No. 264,911 filed January 4, 1952.

In the Wallace application a light valve which may be controlled electrically is disclosed. This valve is composed of a smeiconductive body which is ordinarily transparent to long wavelength light particularly that in the infra-red range and whose transparency to that light can be varied by the injection of free charge carriers into that body.

One object of this invention is to improve the modulating efficiency of devices of the type described above and particularly to increase the absorption of light energy which passes through a semiconductive light valve when free charge carriers are injected therein.

One feature of this invention resides in causing a beam of light to pass through a relatively long path in that region of the semiconductive body containing high densities of injected charge carriers.

Another feature of this invention resides in effecting internal reflections of the light passing through a semiconductive body to increase the path length and in so orienting the path that it remains in a region of high injected charge carrier density.

Other features and objects of this invention will be more fully understood from the following detailed description when read in conjunction with the accompanying drawing in which.

Figures 1, 2, 3:
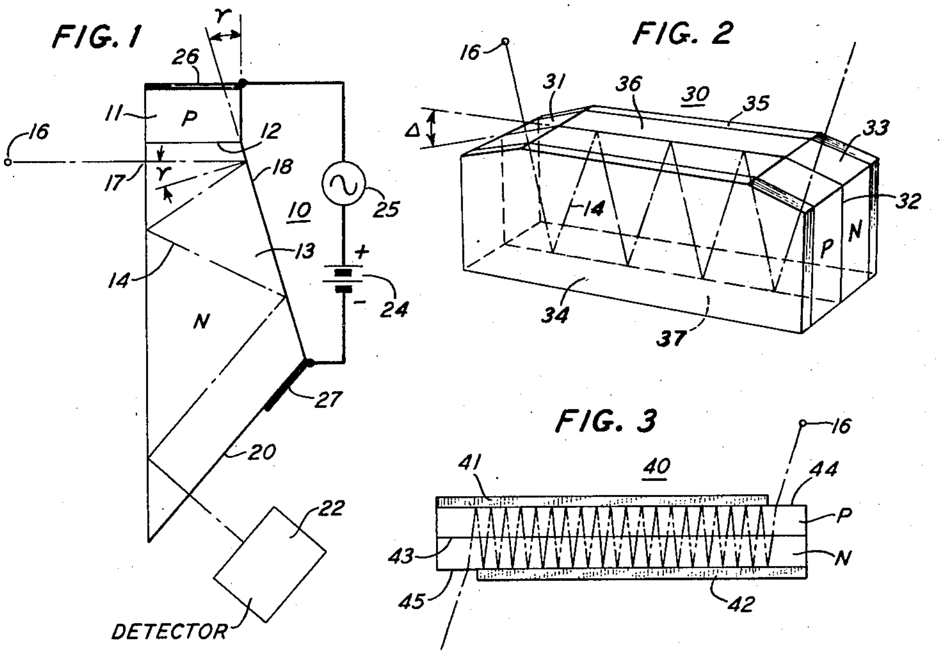
Fig. 1 is an elevation of one form of light valve according to this invention schematically showing the electrical circuit associated therewith.
Fig. 2 is a perspective of another form of valve in which the p-n junction emitter is parallel to the light path therein.
Fig. 3 is an elevation of a light valve having reflecting coatings and a p-n junction transverse the light path therein.

Conduction occurs in semiconductive materials by two processes, each of which is characteristic of a particular type of material. Excess conduction which normally occurs in n-type material is effected by unbound electrons in the crystal structure, while deficit conduction occurring in p-type material is by electron vacancies, commonly referred to as holes. N and p-type materials can also be identified by their rectifying characteristics when associated with a restricted area metallic contact. A high rate of conduction is observed through the combination of such a contact and n-type material when the contact is biased positive relative to the material while the converse is true of p-type material. The conductivity type of elemental semiconductive materials such as germanium and silicon and their resistivity, or the number of free charge carriers present in the material, depend upon the presence of certain elements, generically "significant impurities," which contribute unbound electrons or holes to the crystal structure. Those materials contributing electrons are known as "donors"; they usually fall in the fifth group of the periodic table, for example phosphorous, arsenic, antimony, and bismuth. Some materials from the third group of the periodic table, for example boron, aluminum, gallium, and indium, contribute holes and are known as "acceptors." These acceptors and donors tend to compensate each other, the hole produced by an acceptor being filled by the electron from a donor so that conductivity type and the density of free charge carriers is determined by the acceptor or donor excess.

High purity semiconductive materials are known to be highly transparent to long wavelength light. Optical elements composed of germanium and silicon have been disclosed in the applications of Briggs, Serial No. 120,383 filed October 8, 1949, and Treuting, Serial No. 145,827 filed February 2, 1950, now Patent No. 2,659,271. Normally high purity semiconductive material is transparent to that light whose quantum energy is insufficient to break the covalent bonds in the material and thus is less than the energy required to transport an electron from the top of the filled energy band of the material to the bottom of the conduction band. The energy gap between the filled and conduction bands in silicon is about 1.1 electron volts and in germanium is about 0.7 electron volts. These energy values correspond to light wavelengths of about 1.2 and 1.85 microns, determined from the equation $$\lambda=\frac{hc}{E}$$

where E is energy, $h$ is Planck's constant, $c$ is the velocity of light and $\lambda$ is the wavelength of light. These critical wavelengths are referred to as the threshold wavelength of the materials, greater wavelengths passing through the materials with little attenuation since their quantum energies are too low to break the covalent bonds and the purity level of the material employed is so high that few free charge carriers created by impurities are present.

In the above-noted Wallace application it is pointed out that the light transmission through semiconductive bodies may be altered by altering the density of free charge carriers therein. By generating free charge carriers in the semiconductor a medium for absorbing the energy of these long wavelength light quanta is created. Thus, the transparency of the material is varied in one form of the devices by emitting electrons or holes or both into the body so that they are present to absorb the energy of the light quanta passing through the body. Several forms of emitters are known and in the present disclosure two forms are disclosed, namely point contacts and p-n junctions.

Since the modulation of light by injected charge carriers in a semiconductive body depends on the extent of change which can be effected in the number of free charge carriers to which that light is exposed, it in turn depends on the concentration of free charge carriers which can be injected along the light path which in the absence of the injected carriers is essentially free of carriers, and the length of that path. Various means of injecting free charge carriers are set forth in the aforenoted Wallace application including short wavelength light, heat, bombardment by high energy particles, emission from metallic emitters and emission from p-n junctions. The increase in the path length can be accomplished in accordance with this invention by reflecting the light beam a multiplicity of times within the semiconductor. A semiconductor-air interface when intercepted by a light beam at the proper angle totally reflects the light as will specially prepared reflecting surfaces utilizing materials other than air at the interface.

For light in a semiconductor incident at a semiconductor-air interface, total reflection takes place for incidence angles greater than that given by sin $$\alpha_c=\frac{1}{\mu}$$

where $\alpha_c$ is the critical angle of incidence and $\mu$ is the refractive index of the semiconductor against air. $\mu$ is about 4 and 3.6 for germanium and silicon respectively; hence $\alpha_c$ for these materials is about 14° 30′ and about 16° 10′ respectively and incidence angles greater than these values will result in total reflection. In various embodiments of a modulator constructed in accordance with this invention, light is admitted to the interior of a semiconductive body for example by means of a specially prepared entrance surface which is cut normal to the light beam or at an angle less than the critical angle of incidence for that beam. This light is then internally reflected a plurality of times so that its path length is greater than a path directly through it and preferably is in a region into which a high free charge carrier concentration can be injected. The light is then permitted to leave the body at a specially prepared semiconductor-air interface which it intercepts at less than the critical angle of incidence.

In Fig. 1 of the drawing a light modulator comprising a semiconductive body 10 including a p-type section 11, a junction emitter 12, and an n-type section 13 is disclosed. In this construction, the entire light path 14 falls in the n-type section of the body. Collimated light from source 16 enters the body at surface 17 normal to that surface and therefore passes directly through with a minimum of reflection. This beam continues through the semiconductive body to the rear face 18 which is oriented from the normal of that beam at an angle λ which is greater than the angle of total reflection of that beam. This angle may be about 15 degrees in germanium for light of greater than threshold wavelength. The beam is reflected from the surface 18 to surface 17 which it strikes at an angle of 90 degrees minus 2λ. It is again reflected from that surface to surface 18 which reflects it to surface 17 and thence to exiting surface 20 which is oriented normal to the beam and, therefore, causes a minimum of reflection at the semiconductive-air interface.

Light modulation in the body 10 is effected solely in the n-type section of the body which should be of high purity material so that the density of free charge carriers normally present is low and the normal light attenuation is low. The light path, therefore, lies only in the n region 13 and the function of p section 11 is as an emitter of holes across junction 12 upon the application of the proper field. Hole injection can be facilitated by forming p section 11 of high conductivity material so that it normally has a high hole density.

The modulating operation of the body 10 is effected by applying a bias from battery 24 and signal from source 25 to electrodes 26 and 27 making ohmic contact to the p and n sections 11 and 13, respectively. When the p-type section is poled positive relative to the n-type section by applying a positive signal to electrode 26, large numbers of holes are injected from the p section across the p-n junction and into the n section where they modify the transparency of the n section according to their density. Since charge carrier injection occurs at the p-n junction and decays as the spacing from the junction increases, a large portion of the light energy is absorbed in the first pass across the body 10, and in the second and further passes smaller percentages of the remaining light is absorbed since those portions of the path are further from the emitter and therefore in regions of lower hole density. It is believed that for this form of device no more than four passes of light through the body are entirely practical since the injected charge carrier density in the regions which further passes would occur would be extremely small.

Another form of modulator utilizing the reflection at a semiconductor-air interface to increase the path length of the light in the body and a p-n junction to inject charge carriers into the region of the path is shown in Fig. 2. In this embodiment a beam of collimated light 14 from source 16 enters the body 30 at a surface 31 normal to the light beam and is caused to pass through the body in the vicinity of a p-n junction which is located in a plane which is essentially parallel to that defined by the several passes of the light beam. In this arrangement the light beam at all times is in a region of high injected charge carrier density. It may extend across the junction and thus be modulated by both electrons in the p section and injected holes in the n section or it may be caused to pass through only one type of material and thus be modulated by only one type of injected charge carrier.

The modulator body 30 is in the form of a rectangular parallelepiped modified to the extent of entrance and exit surfaces 31 and 33, having a p-n junction parallel to its major faces. The entrance and exit surfaces 31 and 33 for this body are both cut at an angle Δ greater than the angle of total reflection from the reflecting faces 36 and 37 of the body, so that the light beam in passing through surface 31 without refraction contacts semiconductor-air interface 37 with an angle greater than the critical angle of incidence and is reflected therefrom to surface 36 which it intercepts with the same angle. The light is thus trapped within the body and travels along its length with a number of reflections until it intercepts the semiconductor-air interface at exit surface 33 which is positioned normal to the beam and therefore passes it to the exterior. An electrical signal is applied to this modulator in the manner of the modulator of Fig. 1 by means of electrodes 34 and 35 on the major faces.

The path length for a given rectangular parallelepiped can be increased as shown in Fig. 3 by utilizing reflecting layers on the modulator body surface as a substitute for the semiconductor-air interface reflecting surfaces and by employing incidence angles for the light beam within the body which are closer to normals to those reflecting surfaces. The presence of these supplemental reflecting surfaces eliminates the requirement that the angle of incidence of the light beam be greater than the critical angle of incidence of the semiconductor-air interface. In Fig. 3 the semiconductive body is provided with electrodes on its upper and lower surface and has a p-n junction whose plane is parallel to those electrodes and transverse the light path. Collimated light from source 16 is made to intercept an entrance flat 44 of the modulator body 40 at an angle intermediate normal and the angle of total reflection of a semiconductor-air interface. This beam of light in passing through the semiconductive air interface is refracted to an angle more nearly normal to that surface in accordance with the formula the sine of the angle of refraction is equal to the sine of the angle of incidence divided by the relative index of refraction of the semiconductor against air. The light beam within the body is nearly normal to the unitary electrode reflecting surfaces 41 and 42 which may conveniently be a layer of aluminum or other metal and passes across p-n junction 43 to reflecting coating 42 which is immediately below the entrance flat. This beam is then reflected to the reflecting coating 41 which may be in the same plane and immediately adjacent the entrance flat 44. Reflections of the beam between surfaces 41 and 42 and across p-n junction 43 occur a number of times as the beam progresses longitudinally along the modulator body 40. When the beam reaches the uncoated surface 45 forming an exit flat in the same plane as the reflecting coating 42 and intercepts that flat at an angle of incidence less than the angle of total reflection it passes through that surface with a compensating refraction which operates according to the same formula set forth above so that after the beam leaves that surface it is parallel to and displaced from the entering beam from source 16.

Modulation is effected in the structure of Fig. 3 in a similar manner to that in the modulator of Fig. 2 by causing the light beam to travel in regions of high injected free charge carrier density. This charge carrier density is modulated by applying a signal between the electrodes 41 and 42 associated respectively with the n and p sections of the semiconductor body so that when the n side is biased negative relative to the p side, when the junction is biased in the forward direction, electrons are emitted into the p-type sections and holes into the n-type section and thus the energy of the light quanta within the body is transferred to these free charge carriers thereby absorbing the light.

The preceding discussion and the embodiments disclosed have presumed flat surfaces as nearly optically perfect as practical for the entrance, exit, and reflecting surfaces. As pointed out above light in a semiconductive body can exit from that body only on meeting a semiconductor-air interface at an incidence angle less than the angle of total reflection. If light is introduced into a rectangular parallelepiped of semiconductive material with polished surfaces such that it has an incidence angle greater than the angle of total reflection with the first interface it intercepts, it will be incident on all the following surfaces which are parallel or perpendicular to the first at angles equal to the first angle or 90 degrees less the first angle. Thus, for angles between the angle of total reflection and 90 degrees less the angle of total reflection the light will be trapped and will undergo a large number of internal reflections until it intercepts a surface at less than the angle of total reflection from the normal thereto.

Figure 4:
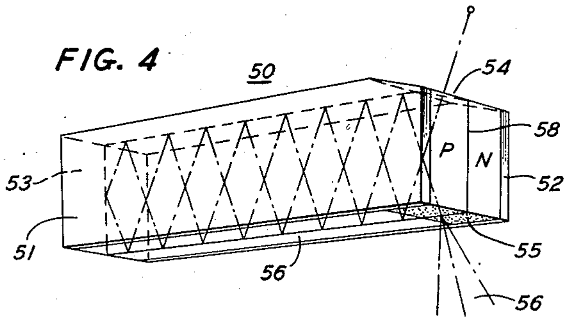
Fig. 4 is a perspective of a light valve arranged to pass the light through the same region twice.

In Fig. 4 a body is shown containing an n-p junction as an emitter of free charge carriers and arranged so that the light path defines a plane essentially parallel to that n-p junction and in the region of that junction. In this embodiment the light path is caused to travel through the same region of the semiconductor modulator body twice by modifying the structure of Fig. 2 through the substitution of a return reflecting surface 53 which is perpendicular to the major reflecting surfaces and is therefore intercepted by the light beam at an angle greater than the angle of total reflection to reflect that beam back through the region through which it has passed. A new form of exit region has also been provided in the structure. While the conventional optical flat normal to the light beam forms entrance surface 54 corresponding to entrance surface 31 in the embodiment of Fig. 2, the exit region 55 is in the same plane as major reflecting surface 56; however, it has been roughened by sand blasting so that the beam of light is incident on portions of this roughened area at angles of less than the angle of total reflection from the normal. Since the beam intercepts this exit surface at a number of angles it exits from that surface in a dispersed cone as illustrated at 57 in the drawing. The usual form of light modulation is effected in this structure namely that of applying a signal across the p-n junction 58 as described above.

Figure 5:
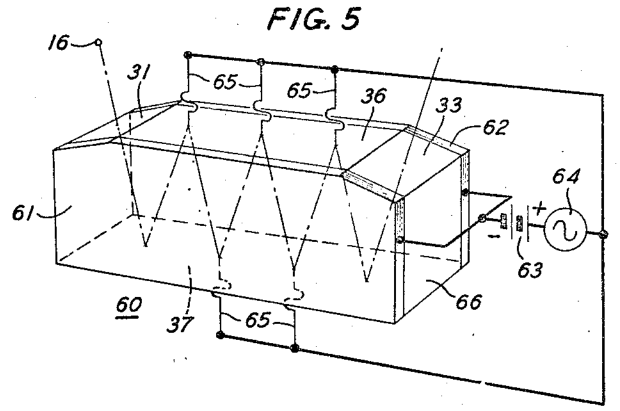
Fig. 5 is an elevation of a light valve utilizing a plurality of point contact emitters.

A device optically identical with that of modulator body 30 shown in Fig. 2 is depicted in Fig. 5. This modulator 60 is provided with a modulating means different from that disclosed in the preceding figures in that a plurality of parallel point contact emitters have been substituted for p-n junctions. The body 60 is arranged with electrodes 61 and 62 making ohmic connections to its surface and connected together to a bias battery 63 which in turn is connected to a signal source 64 and thence to point contact emitters 65. These point contact emitters are connected in parallel and positioned on the reflecting surfaces of the modulator body in the regions at which a collimated beam of light from source 16 strikes those surfaces. This form of charge carrier emitter is biased in the forward direction of conduction by the battery 63; thus, where an n-type semiconductive body 66 is employed, the point contacts 65 are poled positive relative to that body thereby injecting holes into it. A varying signal from source 64 will vary the rate of hole injection into the body and as in the preceding instances the resulting change in hole density will change the rate of light absorption thereby modulating the light exiting from surface 33.

In the preceding discussion the term semiconductor has been employed generically. It is intended that both silicon which is transparent to light of greater than 1.2 microns wavelength and germanium which is transparent to light of greater than 1.85 microns wavelength be included within the term semiconductor. Since it is desirable that the material be homogeneous for both optical and electrical reasons, these materials may advantageously be in single crystal form.

It is to be understood that the above-described arrangements are illustrative of the application of the principles of the invention. Numerous other arrangements may be devised by those skilled in the art without departing from the spirit and scope of the invention.

What is claimed is:

1. A valve for a light beam, comprising a semiconductive body which is normally transparent to light of greater than a threshold wavelength, said body having a surface arranged to admit the light beam to the interior of said body, said body having also a second surface arranged to internally reflect said light beam within said body and a third surface arranged to pass said reflected light beam to the exterior of said body, and electrical means for injecting free charge carriers into said semiconductive body in the region traversed by said light beam.

2. A light valve comprising a semiconductive body of material which normally transmits a substantial fraction of the light having a wavelength greater than the threshold wavelength of the material, means for injecting free charge carriers into said body whereby the light transmission of the material of said body is reduced, a surface on said body arranged to admit light to the interior of said body, means for reflecting a beam of light which enters said body at a second surface of said body, and a surface on said body oriented to intercept the light beam which has been reflected and arranged to transmit said light beam to the exterior of said body.

3. A light valve comprising a semiconductive body of material which normally transmits a substantial fraction of the light having a wavelength greater than the threshold wavelength of the material, means for injecting free charge carriers into said body whereby the transparency of the material of said body to the light is reduced, a surface on said body arranged to admit light to the interior of said body, means for passing a beam of light which enters said body across said body a plurality of times, and a surface on said body oriented to intercept a beam of light after it has made a plurality of passes in said body and arranged to transmit said light to the exterior of said body.

4. A light valve comprising a semiconductive body of a material which normally transmits a substantial fraction of the infra-red light incident thereon, means for injecting free charge carriers into said body whereby the transparency of the material of said body to the light is reduced, and means for passing a beam of infra-red light which enters said body, across said body a plurality of times.

5. A light valve comprising a semiconductive body of material which normally transmits a substantial fraction of the light having a wavelength greater than the threshold wavelength of the material, means for injecting free charge carriers into said body whereby the light transmission of the material of said body is reduced, a surface on said body arranged to admit light to the interior of said body, a surface of said body oriented relative to a beam of light within said body at an angle greater than the critical angle of incidence and reflecting the light, and a surface on said body oriented to intercept the light beam which has been reflected and arranged to transmit said light beam to the exterior of said body.

6. A valve for a light beam comprising a semiconductive body which is normally transparent to light greater than a threshold wavelength, a surface on said body normal to said light beam to admit said beam to the interior of said body, a second surface on said body coated with a medium which produces a reflecting surface for the light beam within said body, a third surface arranged to pass said reflected light beam to the exterior of said body, and electrical means for injecting free charge carriers into said semiconductive body in the region traversed by said light beam.

7. A light valve comprising a semiconductive body which is normally transparent to light greater than a threshold wavelength, means for injecting free charge carriers into said body whereby the light transmission of the material of said body is reduced, means for passing a beam of light of greater than the threshold wavelength through the body a plurality of times, and a roughened surface on said body arranged to pass said light.

8. A valve for a light beam comprising a semiconductive body which is normally transparent to light of greater than a threshold wavelength, a surface on said body arranged to admit said light beam to the interior of said body, a second surface on said body arranged to internally reflect said light beam within said body, a third surface arranged to pass said reflected light beam to the exterior of said body, a p-n junction within said body substantially coplanar with the plane defined by the path of the light beam, and means for imposing an electrical signal on said junction whereby free charge carriers are injected into said semiconductive body in the region traversed by said light beam.

9. A valve for a light beam comprising a semiconductive body which is normally transparent to light of greater than threshold wavelength, a surface on said body arranged to admit said light beam to the interior of said body, a second surface on said body arranged to internally reflect said light beam within said body, a third surface arranged to pass said reflected light beam to the exterior of said body, a p-n junction lying in a plane substantially perpendicular to the plane of the path of the trapped light beam within the body, and means for imposing an electrical signal on said junction whereby free charge carriers are injected into said semiconductive body in the region traversed by said light beam.

10. A valve for a light beam comprising a semiconductive body which is normally transparent to light of greater than a threshold wavelength, a surface on said body arranged to admit said light beam to the interior of said body, a second surface on said body arranged to internally reflect said light beam within said body, a third surface arranged to pass said reflected light beam to the exterior of said body, a plurality of electrically parallel restricted area contacts engaging the surface of said semiconductive body, and means for applying a signal to said contacts whereby free charge carriers are injected into said semiconductive body to reduce the transparency of the material of said body.

11. A light valve comprising a germanium body which is normally transparent to light of wavelength greater than 1.8 microns, a surface on said body normal to said light beam to admit said light beam to the interior of said body, a second surface of said body oriented with respect to the light beam within said body so that it is intercepted by said beam at an angle greater than the critical angle of incidence, a third surface normal to said reflected light beam to pass said reflected light beam to the exterior of said body, and a p-n junction within said body substantially coplanar with the plane defined by the path of trapped light beam, and means for imposing an electrical signal on said junction whereby free charge carriers are injected into said semi-conductive body in the region traversed by said light beam.

12. A valve for a light beam comprising a semiconductive body which is normally transparent to light greater than a threshold wavelength, a surface on said body oriented relative to a beam of light incident thereon at an angle less than the critical angle of incidence whereby light is admitted to the interior of said body, a second surface on said body coated with a medium which produces a reflecting surface oriented to intercept the light beam admitted into the body, a third surface arranged to intercept and to pass the reflected light beam to the exterior of said body, and electrical means for injecting free charge carriers into said semiconductive body in the region traversed by the light beam.

13. A light valve comprising a semiconductive body of a material which is normally transparent to a substantial fraction of light having a wavelength greater than the threshold wavelenth of the material, means for injecting free charge carriers into said body whereby the transparency of the material of said body to the light is reduced, a first surface on said body oriented with respect to a beam incident thereon at an angle less than the critical angle of incidence and admitting a portion of the beam to the interior of said body, a second surface on said body oriented to intercept said beam within said body at an angle greater than the critical angle of incidence and reflecting the beam, and a third surface oriented to intercept the reflected beam at an angle less than the critical angle of incidence whereby the light beam is transmitted to the exterior of said body.

References Cited in the file of this patent

UNITED STATES PATENTS

| Number | Name | Date |
|---|---|---|
| 2,185,379 | Myers | Jan. 2, 1940 |
| 2,312,206 | Cablick | Feb. 23, 1943 |
| 2,455,763 | Harrison | Dec. 7, 1948 |

FOREIGN PATENTS

| Number | Country | Date |
|---|---|---|
| 342,219 | Great Britain | Jan. 29, 1931 |